(12) United States Patent
Binks et al.

(10) Patent No.: US 9,403,599 B2
(45) Date of Patent: *Aug. 2, 2016

(54) INLET SECTION OF AN AIRCRAFT ENGINE NACELLE

(75) Inventors: Alan Binks, San Diego, CA (US); Norman John James, San Diego, CA (US); Michael John Layland, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 1149 days.

This patent is subject to a terminal disclaimer.

(21) Appl. No.: 13/595,896

(22) Filed: Aug. 27, 2012

(65) Prior Publication Data
US 2014/0064927 A1 Mar. 6, 2014

Related U.S. Application Data

(63) Continuation of application No. 13/091,615, filed on Apr. 21, 2011, now Pat. No. 8,267,642, which is a continuation of application No. 12/423,550, filed on Apr. 14, 2009, now Pat. No. 8,197,191.

(51) Int. Cl.
*B64D 29/06* (2006.01)
*B64D 29/08* (2006.01)
*B64D 33/02* (2006.01)

(52) U.S. Cl.
CPC ............. *B64D 29/06* (2013.01); *B64D 29/08* (2013.01); *B64D 33/02* (2013.01); *B64D 2033/0206* (2013.01); *Y02B 10/30* (2013.01); *Y02E 10/726* (2013.01); *Y10T 137/0536* (2015.04)

(58) Field of Classification Search
CPC ...................................................... B64D 29/06

USPC ............................................................. 415/9
See application file for complete search history.

(56) References Cited

U.S. PATENT DOCUMENTS 4,379,191 A * 4/1983 Beggs ...................... B32B 3/12
181/292
4,817,756 A 4/1989 Carr et al.
(Continued)

FOREIGN PATENT DOCUMENTS

CA 2 500 963 9/2005
EP 1398472 3/2004
(Continued)

OTHER PUBLICATIONS

European Search Report dated Feb. 1, 2012 issued in counterpart European Application No. 10003209.3.
(Continued)

*Primary Examiner* — Richard Edgar
(74) *Attorney, Agent, or Firm* — Snell & Wilmer, LLP

(57) ABSTRACT

A nacelle inlet for an aircraft engine of a type having an engine fan case with a forward flange includes an acoustic inner barrel having a forward edge and an aft edge, an outer shell having a nose lip portion with a trailing inner edge, and an outer barrel portion having an aft portion. The nacelle inlet also includes an aft attachment flange configured to attach the inlet to the forward flange of the engine fan case, and an aft bulkhead having an aft end and connecting the outer barrel portion of the outer shell to the aft attachment flange. The forward edge of the acoustic inner barrel is connected to the trailing inner edge of the nose lip portion, and the aft portion of the inner barrel is attached to the aft attachment flange.

13 Claims, 12 Drawing Sheets

(56) References Cited

U.S. PATENT DOCUMENTS

| | | | |
|---|---|---|---|
| 5,000,399 A | 3/1991 | Readnour | |
| 5,297,765 A | 3/1994 | Hughes et al. | |
| 5,581,054 A * | 12/1996 | Anderson et al. | 181/213 |
| 6,089,505 A | 7/2000 | Gruensfelder et al. | |
| 6,328,258 B1 | 12/2001 | Porte | |
| 7,334,393 B2 * | 2/2008 | Porte | B64C 7/02 60/226.1 |
| 7,383,679 B2 | 6/2008 | Porte | |
| 7,721,525 B2 | 5/2010 | Shutrump | |
| 8,152,461 B2 * | 4/2012 | Howarth | B64D 29/00 415/213.1 |
| 8,197,191 B2 * | 6/2012 | Binks et al. | 415/119 |
| 2004/0045765 A1 | 3/2004 | Porte | |
| 2005/0269443 A1 | 12/2005 | Porte | |
| 2006/0145001 A1 * | 7/2006 | Smith | B64D 29/06 244/110 B |
| 2008/0016844 A1 * | 1/2008 | Shutrump | B64D 29/02 60/226.1 |
| 2010/0084507 A1 | 4/2010 | Vauchel et al. | |

FOREIGN PATENT DOCUMENTS

| | | |
|---|---|---|
| EP | 1582701 | 10/2005 |
| EP | 1 582 702 | 10/2006 |
| FR | 2 868 124 | 6/2006 |
| FR | 2906568 | 4/2008 |

OTHER PUBLICATIONS

Official Action dated Sep. 29, 2011 (U.S. Appl. No. 12/423,550, filed Apr. 14, 2009) pp. 1-10.
Official Action dated Nov. 22, 2011 (U.S. Appl. No. 13/091,615, filed Apr. 21, 2011) pp. 1-14.

* cited by examiner

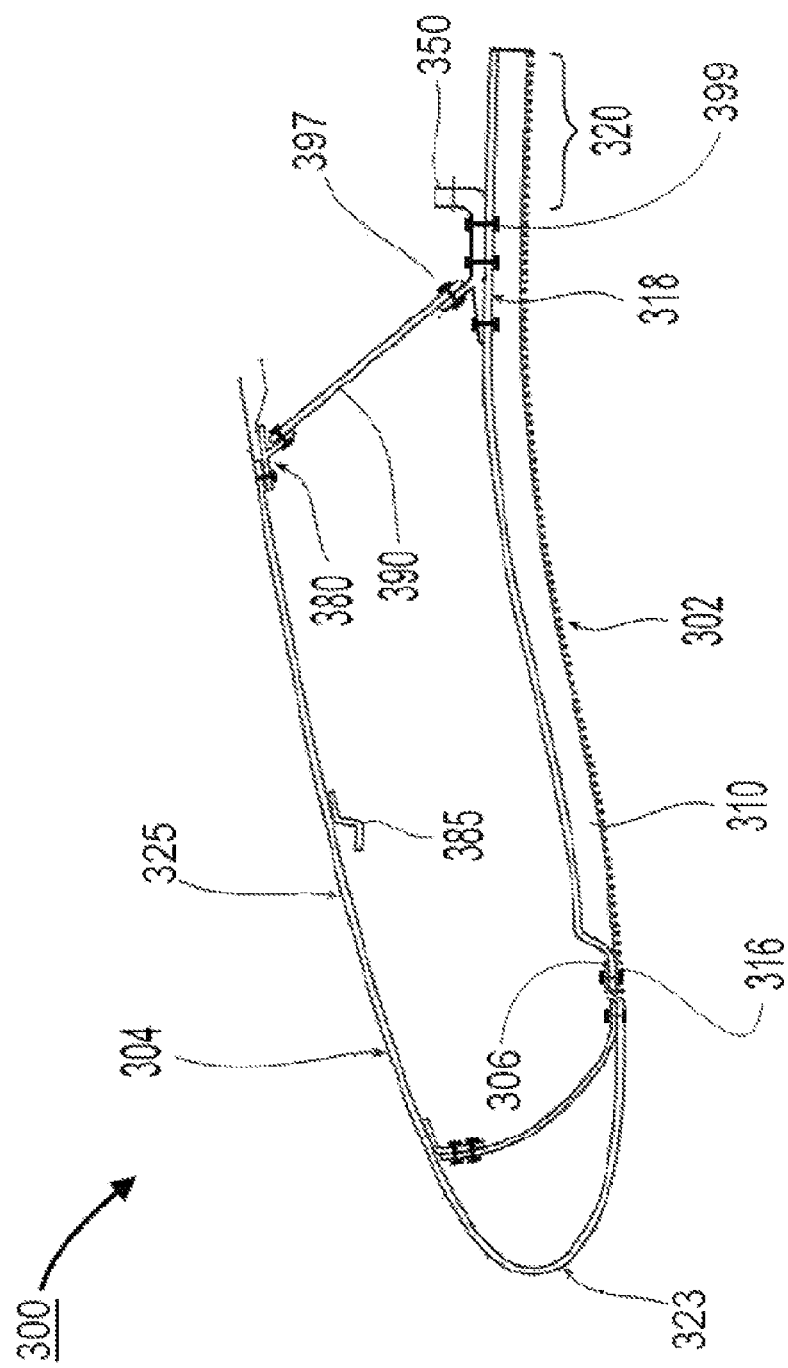

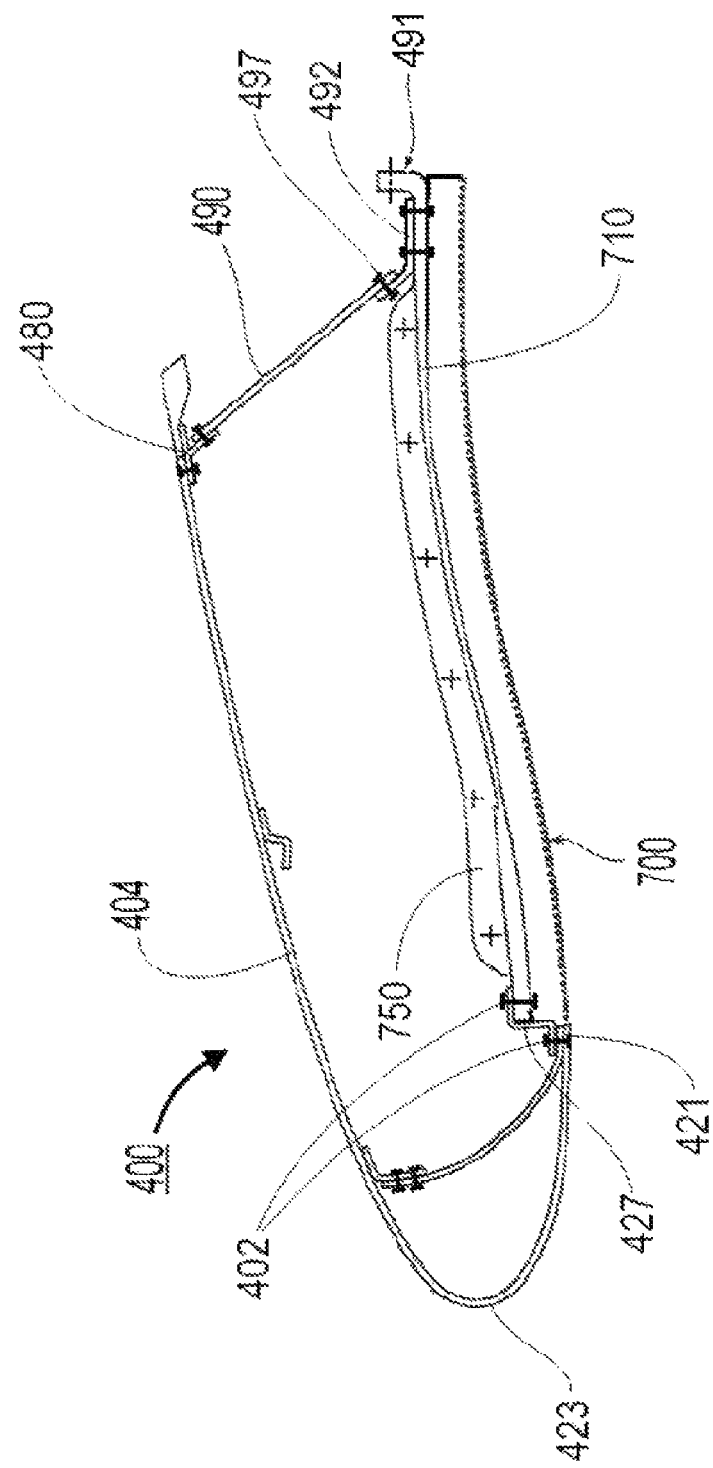

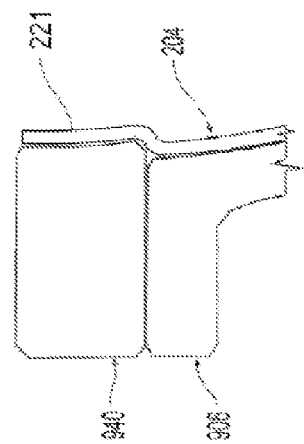
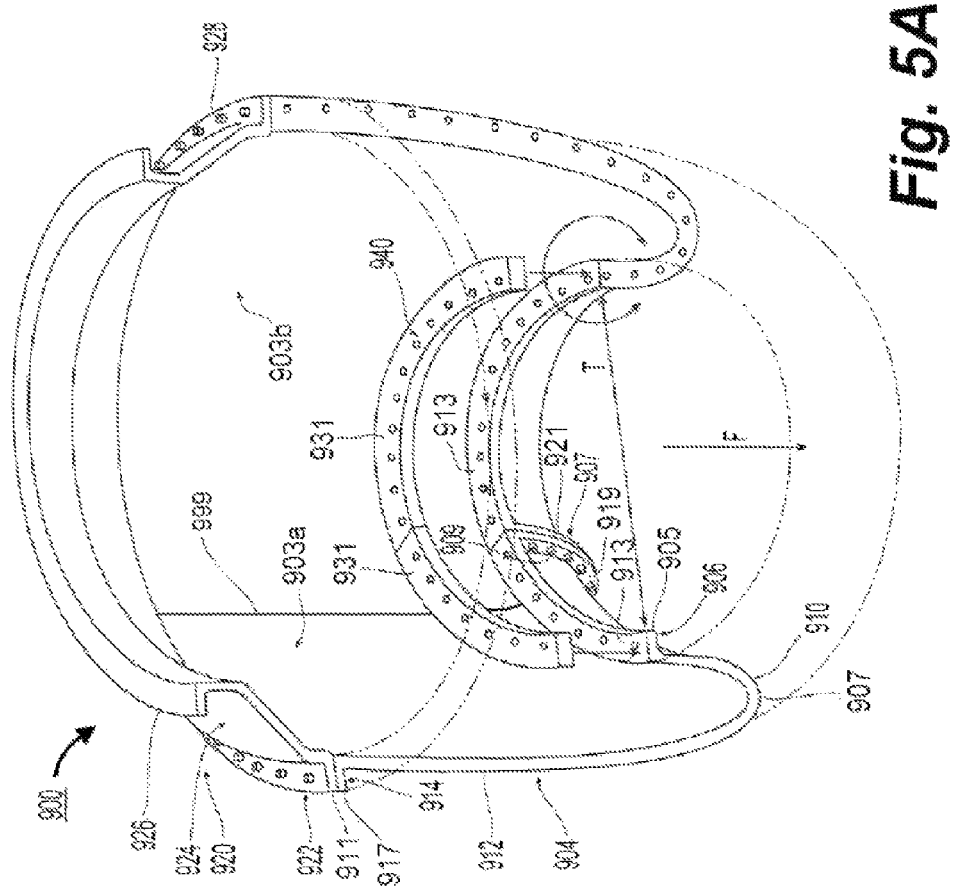
Fig. 5B
Fig. 5A

INLET SECTION OF AN AIRCRAFT ENGINE NACELLE

CROSS-REFERENCE TO RELATED APPLICATIONS

This application is a continuation of co-pending U.S. application No. 13/091,615, filed Apr. 21, 2011, which is a continuation of U.S. application No. 12/423,550, filed Apr. 14, 2009, now issued as U.S. Pat. No. 8,197,191 on Jun. 12, 2012, each of which is hereby incorporated by reference in its entirety.

BACKGROUND OF THE INVENTION

1. Field of the Invention

The invention relates to nacelles for aircraft engines, and more particularly relates to an improved nacelle for a turbofan engine having an inlet cowl that is designed to assist in achieving a stable fly-home configuration subsequent to a blade-out event.

2. Description of the Related Art

A nacelle for a turbofan engine must meet several basic design criteria. For example, the nacelle should direct air flow to the air intake of the engine while protecting the air flow from disturbances such as gusts, and the like. In addition, the exterior surface profile of the nacelle should minimize the aerodynamic drag caused by the engine and its related components.

As shown in FIGS. 1A and 1B, a modern turbofan engine assembly 10 typically includes a nacelle 22 and a fan case 16. The engine assembly, including the nacelle 22 and fan case 16, can be suspended from an aircraft's wing by a pylon 12. In FIG. 1A, one side of the nacelle structure 22 is removed for ease of illustration. The fan case 16 surrounds the engine's fan 18. The fan 18 includes a plurality of fan blades 19 attached to the engine's rotor. As shown in FIG. 1A, a typical nacelle structure 22 includes a forward inlet portion 24 and an aft nacelle portion 25. The inlet portion 24 is typically attached to a forward flange 14 on the fan case 16 by a plurality of circumferentially spaced fasteners, such as bolts or the like. As shown in FIGS. 1A and 1B, the inlet portion 24 typically includes an outer barrel 32, a rounded nose lip section 28, an inner barrel 30, and one or more spaced bulkheads 34, 36 disposed between the outer barrel 32 and the inner barrel portion 30. The outer barrel portion 32 and nose lip portion 28 can be constructed of a thin metallic material, such as aluminum, for example, or can be constructed of composite materials. The inner barrel 30 typically is constructed of composite materials and includes acoustic treatment configured to attenuate at least some engine noise. Such an acoustically treated inner barrel 30 typically includes a honeycomb core 31 sandwiched between a perforated composite inner skin 33 and an imperforate composite outer skin 35. The composite inner barrel 30 can be constructed in two or more circumferential segments joined together by fasteners, or can be an unsegmented, one-piece composite structure. Some advantages of a one-piece inner barrel 30 over a segmented inner barrel 30 include fewer parts and fasteners, a seamless aerodynamic inner surface, and lower manufacturing costs, for example.

A forward edge 39 of the outer barrel 32 can be connected to the nose lip portion 28 by a first plurality of circumferentially spaced fasteners 47, such as rivets, or the like. Similarly, a forward edge of inner barrel 30 can be connected to the nose lip portion 28 by a second plurality of circumferentially spaced fasteners 37, such as rivets, bolts, or the like. The fasteners 37, 47 secure the components of the inlet portion 24 together, and transmit loads between fastened components. In the embodiment shown in FIG. 1B, a forward bulkhead 38 extends between the outer and inner walls of the nose lip 28, and an intermediate bulkhead 34 and an aft bulkhead 36 connect portions of the outer barrel 32 and the inner barrel 30. The bulkheads 34, 36 contribute to the rigidity and strength of the inlet portion 24. In addition, the intermediate and aft bulkheads 34, 36 transmit loads between the inner barrel 30 and the outer barrel 32. As shown in FIG. 1B, an aft flange 41 on the inner barrel 30 can connect the inlet portion 24 to a forward flange 14 of a fan case 16. Accordingly, the composite inner barrel 30 directly supports the outer barrel 32 and nose lip portion 28. The weight of the inlet portion 24 and external loads borne by the inlet portion 24 are necessarily transferred to the fan case 16 through the inner barrel 30. Therefore, the composite inner barrel 30 of a typical nacelle inlet 24 can substantially contribute to the overall rigidity, strength and stability of the inlet portion 24 of the nacelle 22.

The bulkheads 34, 36, 38 shown in FIG. 1B typically are constructed of a thin metallic material such as aluminum, for example. The bulkheads 34, 36, 38 can be welded to the metallic outer barrel 32 and metallic nose lip portion 28, or can be connected to the outer barrel 32 and/or nose lip portion 28 by mechanical fasteners, such as rivets, or the like. The aft bulkhead 36 and intermediate bulkhead 34 can be fastened to the composite inner barrel 30 by mechanical fasteners such as rivets, bolts, or the like. As shown in FIG. 1B, one or more circumferentially extending reinforcement ribs 21 can be welded or otherwise attached along the inner surface of the outer barrel 32 to stiffen the thin metal skin and maintain an aerodynamic shape.

As discussed below, a typical nacelle structure like that shown in FIGS. 1A and 1B and described above can be improved. U.S. Federal Aviation Administration (FAA) regulations set forth numerous design objectives for aircraft. For example, the structural integrity of an aircraft engine nacelle should be sufficient to permit an associated aircraft to be safely flown and landed following a blade-out event. More specifically, a nacelle 22 should maintain a stable and aerodynamic configuration that will not impede the fly-home capability of an aircraft following a blade-out event. As is known in the art, a "blade out event" arises when a blade is accidentally released from a turbine's rotor, such as when a first-stage fan blade 19 is accidentally released from a rotor of a high-bypass turbofan engine 10. When suddenly released during flight, a fan blade 19 can impact a surrounding fan case 16 with substantial force, and resulting loads on the fan case 16 can be transferred to surrounding structures, such as to the inlet portion 24 of a surrounding nacelle 22. These loads can cause substantial damage to the nacelle inlet 24, including damage to an adjoined inner barrel 30. In addition or alternatively, a released fan blade 19 can directly impact a portion of an adjacent inner barrel 30, thereby causing direct damage to the inner barrel 30. Because the inner barrel 30 directly supports the inlet portion 24 on the fan case 16, including the outer barrel 32 and nose lip portion 28, damage to the inner barrel 30 can compromise the structural integrity and stability of the nacelle inlet 24, and may negatively affect the fly-home capability of an aircraft.

A blade-out event also causes the rotational balance of an engine's fan 18 to be lost. After a damaged engine 10 is shut down following a blade-out event, airflow impinging on the unbalanced fan 18 can cause the fan 18 to rapidly spin or "windmill." Such wind-milling of an unbalanced fan 18 can exert substantial vibrational loads on the engine 10 and fan case 16, and at least some of these loads can be transmitted to an attached inlet portion 24 and inner barrel 30 of the nacelle 22. In addition, following a blade-out event, aerodynamic forces and a suction created by a windmilling fan 18 can exert substantial loads on a damaged inlet portion 24 of the nacelle 22. Such loads can cause substantial deformation of a damaged inlet portion 24 and can result in unwanted aerodynamic drag.

Such loads also can cause cracks or breaks in a damaged composite inner barrel 30 to propagate, further compromising the structural integrity and stability of a damaged inlet portion 24 of a nacelle 22. Without crack-stopping longitudinal joints or reinforced flanges between adjoined circumferential segments of an inner barrel 30, such crack propagation can be more severe in a one-piece inner barrel than in a segmented inner barrel.

As discussed above, the inner barrel 30 of a typical nacelle inlet 24 substantially contributes to the overall strength and rigidity of nacelle inlet's structure. Accordingly, when the inner barrel 30 of an inlet portion 24 of a nacelle is substantially damaged subsequent to a blade-out event, the structural integrity and rigidity of a nacelle's inlet portion 24 may not be sufficient to adequately withstand such suction and/or aerodynamic loads, or to maintain a stable and aerodynamic configuration of the nacelle inlet 24 that is sufficient to support the fly-home capability of an aircraft.

Accordingly, there is a need for a nacelle structure for a turbofan aircraft engine that is capable of maintaining a substantially stable and aerodynamic configuration subsequent to a blade-out event, and which thereby supports an aircraft's fly home capability following such an incident. In particular, there is a need for a nacelle inlet structure for a high-bypass turbofan aircraft engine that maintains its structural integrity and a stable aerodynamic configuration even though its composite inner barrel has been substantially damaged due to a blade-out event. Preferably such an improved nacelle inlet will include a minimal number of components in order to minimize weight and minimize manufacturing costs.

SUMMARY OF THE INVENTION

In one embodiment, the invention includes a nacelle inlet for an aircraft engine of a type having an engine fan case with a forward flange. The nacelle inlet can include an acoustic inner barrel having a forward edge and an aft edge, and an outer shell including a nose lip portion having a trailing inner edge and an outer barrel portion having an aft portion. The nacelle inlet can further include an aft attachment flange configured to attach the inlet to the forward flange of the engine fan case, and an aft bulkhead having an aft end and connecting the outer barrel portion of the outer shell to the aft attachment flange. The forward edge of the acoustic inner barrel can be connected to the trailing inner edge of the nose lip portion, and the aft portion of the inner barrel can be attached to the aft attachment flange.

In another embodiment, the invention includes a nacelle for an aircraft engine of a type having a fan case. The nacelle can include an inlet portion having an acoustic inner barrel, an outer shell including a nose lip portion and an outer barrel portion, and a mounting means for mounting the inlet portion to the fan case. The mounting means can provide a load path from an aft portion of the outer shell to the fan case through the mounting means such that no substantial portion of the load path passes through the acoustic inner barrel.

In a further embodiment, an aircraft engine nacelle can include an inlet portion having an outer shell with a nose lip portion and an outer barrel portion. The inlet portion can further include an inner barrel, an aft bulkhead, and an aft mounting flange. The outer barrel can be connected to the aft bulkhead by a first connection, the aft bulk head can be connected to the aft mounting flange by a second connection, and the inner barrel can be connected to the mounting flange by a third connection. The second connection can be separate from the third connection.

These and other aspects of the invention will be understood from a reading of the following detailed description together with the drawings.

BRIEF DESCRIPTION OF THE DRAWINGS

FIG. 3 is a cross-sectional view of another embodiment of a nacelle inlet portion according to the invention.

FIG. 4 is a cross-sectional view of an additional embodiment of a nacelle inlet portion according to the invention.

FIG. 5A is a cross sectional view of a form tool for producing an outer shell of a nacelle inlet.

FIG. 5B is a cross-sectional view of a portion of the tool shown in FIG. 5A.

DETAILED DESCRIPTION OF PREFERRED EMBODIMENTS

Figure 2:
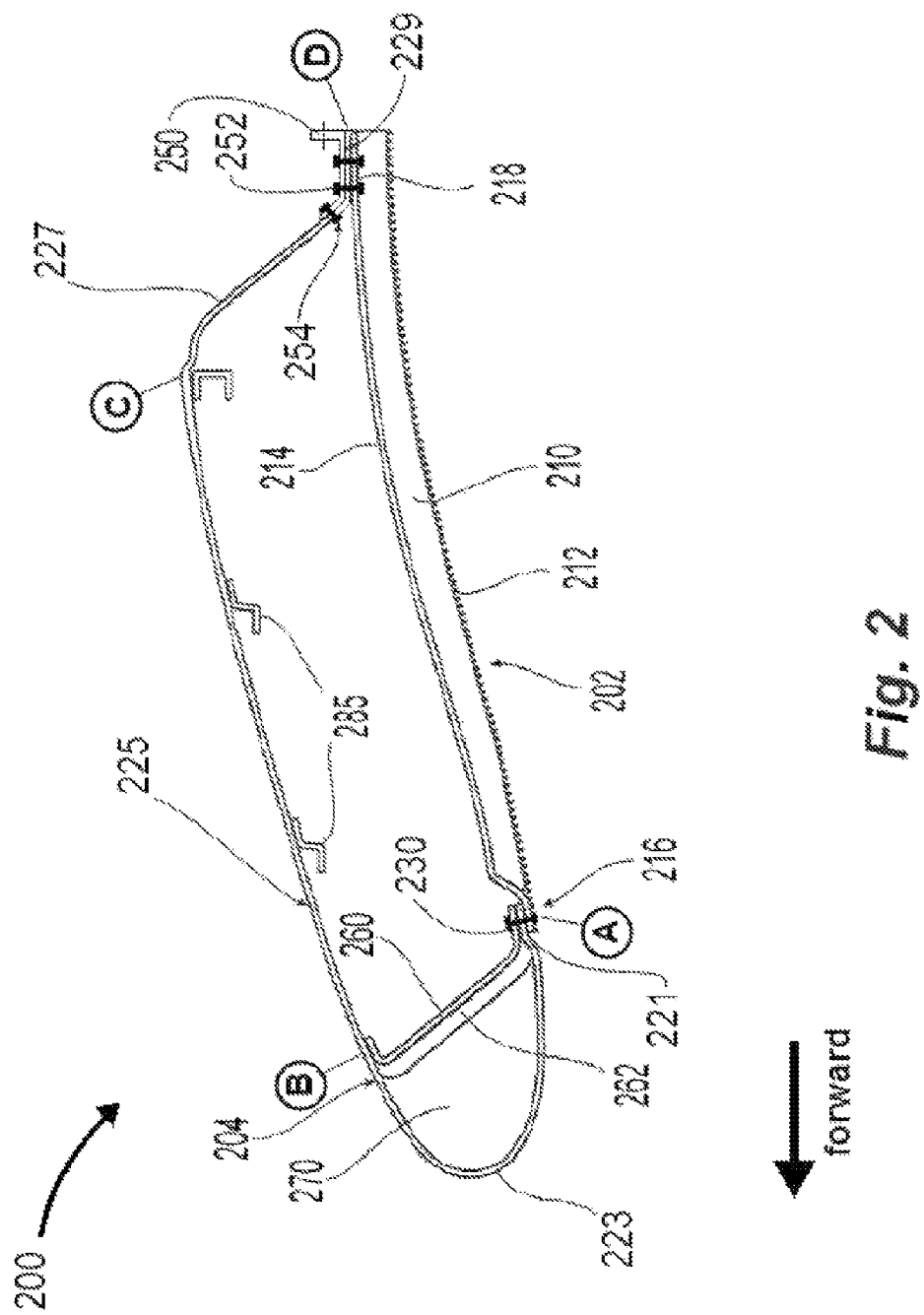
FIG. 2 is a cross-sectional view of one embodiment of a nacelle inlet portion according to the invention.

A cross section of one embodiment of a nacelle inlet portion 200 according to the invention is shown in FIG. 2. In this embodiment, the inlet portion 200 includes an outer shell 204 having a rounded nose lip portion 223, an outer barrel portion 225, and an aft bulkhead portion 227. In FIG. 2, the rounded nose lip portion 223 extends from an inner trailing edge 221 at point "A" to a point "B," the outer barrel portion 225 extends between point "B" and point "C," and the aft bulkhead portion 227 extends between point "C" and a trailing edge 229 at point "D." In the embodiment shown in FIG. 2, the outer shell 204 can be constructed of a continuous piece of material that extends between points "A" and "D." The outer shell 204 preferably has a contoured shape that facilitates laminar airflow and minimizes aerodynamic drag. The outer shell 204 can be constructed in a single piece that circumferentially extends a full 360 degrees around the nacelle inlet portion 200, or the outer shell 204 can be constructed in two or more circumferential segments joined together along longitudinal joints (not shown in the drawings). In one embodiment, the outer shell 204 is formed from a graphite composite. Such a graphite composite may be formed by layering sheets of a resin impregnated graphite fabric on a contoured forming tool, and then bagging and-curing the layered fabric and tool in an autoclave in a manner known in the art. Alternatively, the outer shell 204 may be formed from sheet metal, such as aluminum, such as by stretch forming, spin forming, or the like.

As shown in FIG. 2, the nacelle inlet portion 200 can include an acoustically treated composite inner barrel 202. The inner barrel 202 can be either a one-piece 360 degree structure, or can include a plurality of joined circumferential segments. The inner barrel 202 can include a honeycomb core 210 sandwiched between a perforated composite inner skin 212 and an imperforate composite outer skin 214. The manufacture of such an acoustically treated composite inner barrel 202 is known to those skilled in the art. As shown in FIG. 2, the inner barrel 202 can include a forward flange 216 for connecting the inner barrel 202 to the inner trailing edge 221 of the nose lip portion 223 of the outer shell 204. The forward flange 216 of the inner barrel 202 can be attached to the inner trailing edge 221 of the outer shell 204 by a plurality of circumferentially spaced fasteners 230, such as rivets or the like. As shown in FIG. 2, the forward flange 216 of the inner barrel 202 and the trailing edge 221 of the nose lip portion 223 of the outer shell 204 can be configured to provide a substantially continuous aerodynamic surface along their juncture at point "A."

One or more circumferential stiffeners 285 can be attached along the inner surface of the outer barrel portion 225 in order to stiffen the outer barrel portion 225 and maintain its aerodynamic shape. The circumferential stiffeners 285 can be attached to the outer barrel portion 225 with adhesive and/or fasteners, such as rivets, for example. Alternatively, when the outer shell 204 is metal, the stiffeners 285 can be attached by welding. As shown in FIG. 2, the nacelle inlet 200 can include a forward bulkhead 260 that extends between the inner trailing edge 221 of the nose lip portion 223 at point "A" and the transition between the nose lip portion 223 and the outer barrel portion 225 at point "B." The forward bulkhead 260 can be formed of aluminum, titanium or another suitable material. The forward bulkhead 260 combines with nose lip portion 223 to form a D-channel 270. Heated air can be forced through the D-channel 270 in a known manner to prevent or eliminate ice formations on the outer surface of the nose lip portion 223.

As shown in FIG. 2, the aft bulkhead portion 227 of the outer shell 204 can extend radially inwardly and rearwardly from an aft edge (point "C") of the outer barrel portion 225, and can include a rearwardly extending trailing edge 229. The trailing edge 229 of the aft bulkhead portion 227 can be configured for connection to an aft portion 218 of the inner barrel 202 and for connection to a mounting flange 250. In the embodiment shown, the trailing edge 229 of the aft bulkhead portion 227 can have a substantially cylindrical shape. The mounting flange 250 can be configured for fastening the nacelle inlet 200 to a forward flange of a fan case (not shown), and can include a circle of bolt holes corresponding to a matching circle of bolt holes in the fan case (not shown in FIG. 2). In the embodiment shown in FIG. 2, the mounting flange 250, the trailing edge 229 of the aft bulkhead portion 227 and the aft portion 218 of the outer skin 214 of the inner barrel 202 overlap or underlap each other, and are secured together by a plurality of circumferentially spaced fasteners 252, such as rivets, bolts, or the like. As also shown in FIG. 2, the mounting flange 250 can also be directly fastened to the aft bulkhead portion 227 by another plurality of circumferentially spaced fasteners 254, such as rivets, bolts, or the like.

Unlike prior nacelle inlet designs, the mounting flange 250 can be directly connected to the aft bulkhead portion 227 of the outer shell 204 rather than to only the inner barrel 202, and thus, the outer shell 204 is directly supported by an associated fan case when the mounting flange 250 is bolted to the fan case. Accordingly, a direct load path is provided from the outer shell 204 to a supporting fan case whereby loads on the outer shell 204 can be transmitted to the fan case without having to pass through the inner barrel 202. This direct load path ensures that the structural integrity and stability of the nacelle inlet 200 can be maintained even though the structural integrity of the inner barrel 202 may be compromised as the result of a blade-out event. In other words, by providing a direct connection between the outer shell 204 and a supporting fan case that is independent from a connection between the inner barrel 202 and the fan case, the strength, rigidity and stability of the nacelle inlet 200 does not substantially depend upon the structural integrity of the inner barrel 202. Accordingly, the nacelle inlet 200 can support the fly-home capability of an aircraft despite substantial damage to its inner barrel 202 due to a blade-out incident. In addition, by providing a direct load path from the outer shell 204 to a supporting fan case, loads on the nacelle inlet 200 can be transmitted to the fan case without substantial stress on the inner barrel 202, thereby reducing the likelihood that damage to the inner barrel 202 will propagate.

Figure 1A:
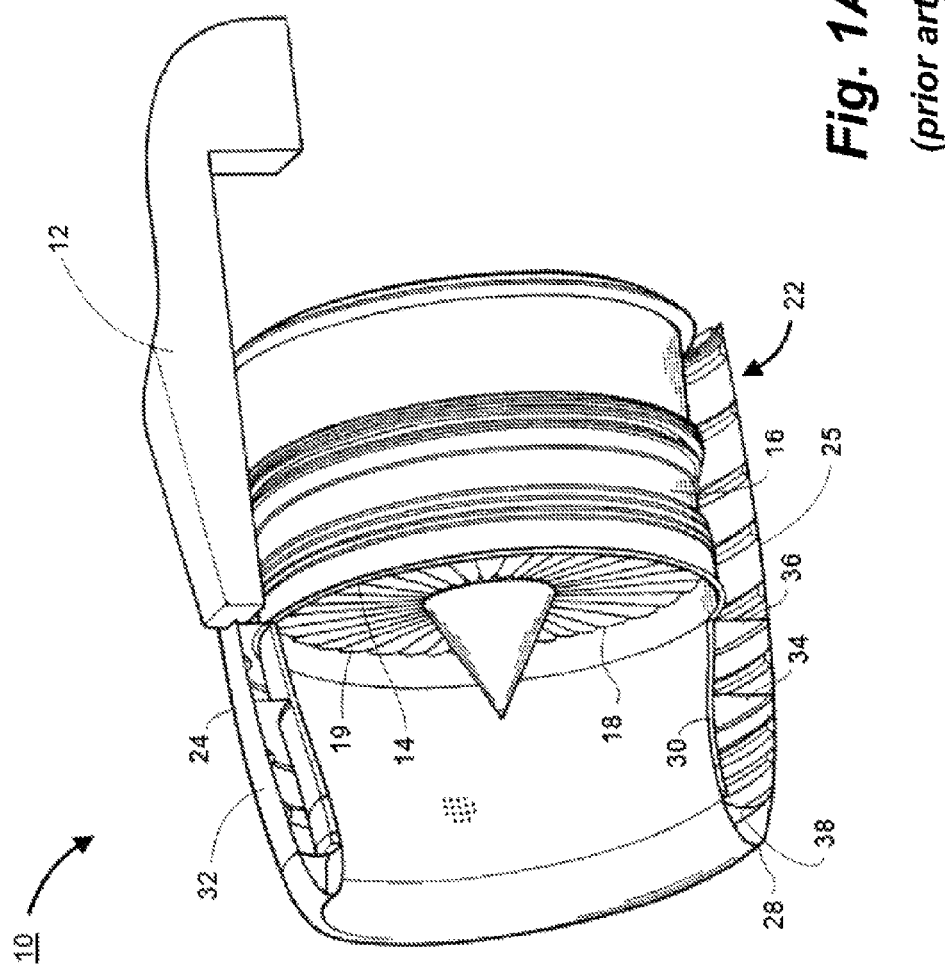
FIG. 1A is a perspective view of a turbofan aircraft engine having a nacelle with a typical prior art inlet portion.
Figure 1B:
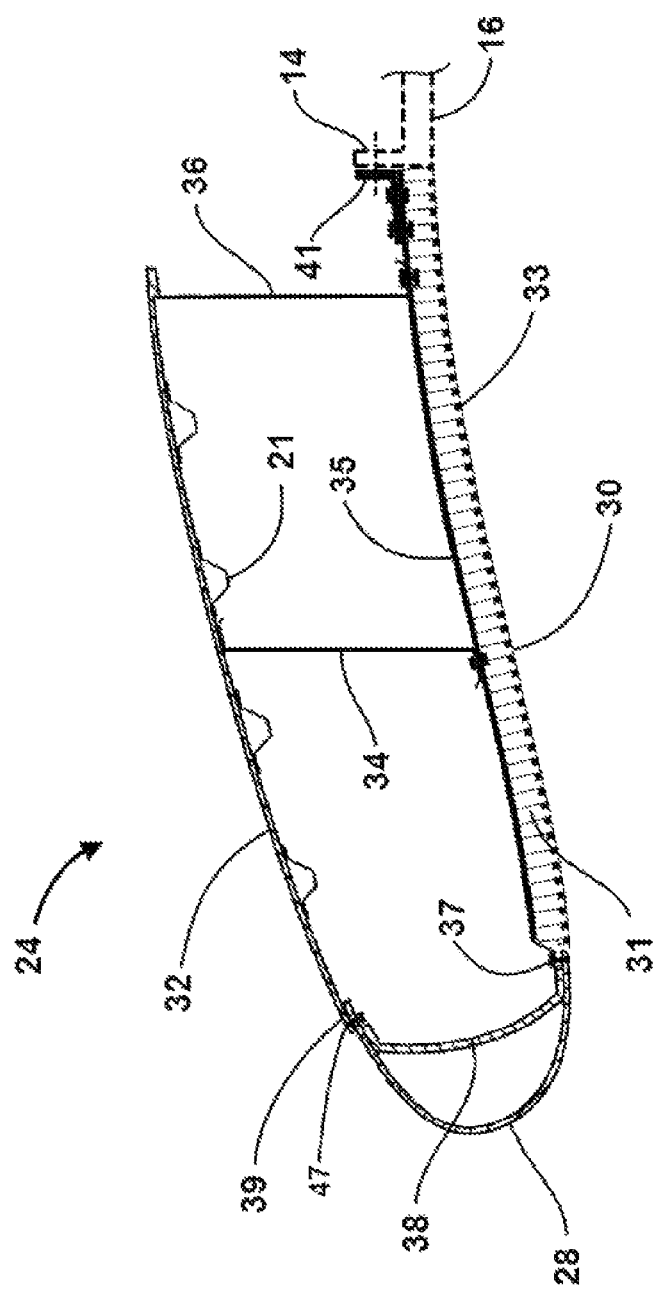
FIG. 1B is a cross sectional view of the prior art nacelle inlet portion shown in FIG. 1A.

Furthermore, in contrast to a prior art nacelle inlet 24 like that shown in FIG. 1B and discussed above that employs rivets 47 to secure its nose lip 28 to its outer barrel 32, the one-piece outer shell 204 of the nacelle inlet 200 can be devoid of such fasteners. This elimination of fasteners along the outer surfaces of the nose lip 223 and outer barrel 225 enhances laminar air flow over the outer shell 204 and reduces aerodynamic drag on the nacelle inlet 200.

A cross section of a second embodiment of a nacelle inlet 300 according to the invention is shown in FIG. 3. In this embodiment, the nacelle inlet 300 includes an acoustically treated inner barrel 302, an outer shell 304, and an aft bulkhead 390. The outer shell 304 can include a nose lip portion 323 and an outer barrel portion 325. The nose lip portion 323 can include a trailing edge 306 that connects to a forward flange 316 on the inner barrel 302. The aft bulkhead 390 connects an aft portion of the outer shell 304 to a mounting flange 350. In one embodiment, the connection between the aft bulkhead 390 and the mounting flange 350 includes a plurality of circumferentially spaced rivets 397, or the like. As shown in FIG. 3, the aft bulkhead 390 can be connected to the aft edge of the outer barrel portion 325 of the outer shell 304 by a connecting ring 380 which can have a substantially T-shaped cross section. The aft bulkhead 390 and the outer barrel portion 325 can be connected to the connecting ring 380 by pluralities of circumferentially spaced fasteners, such as rivets, bolts or the like.

The mounting flange 350 can be secured to an aft portion 318 of the inner barrel 302 using rivets 399, bolts, or other fastening means. The acoustically treated inner barrel 302 can be substantially like the composite inner barrel 202 described above. As shown in FIG. 3, at least a portion 320 of the acoustically treated inner barrel 302 can extend aft of the mounting flange 350 in order to provide acoustic treatment to a forward portion of a mating fan case (not shown in FIG. 3).

The outer shell 304 can be constructed of a composite material using known methods, or can be spin formed or stretch formed from sheet metal, such as aluminum. The outer shell 304 can be constructed in one piece, or can be formed in two or more circumferential segments. As shown in FIG. 3, the aft bulkhead 390 can be canted or inclined in a forward and outward direction such that the aft bulkhead 390 has a generally frusto-conical shape. A frusto-conically shaped aft bulkhead 390 has greater inherent stiffness than the substantially planar aft bulkhead 36 shown in FIG. 1B, for example, due to its three dimensional shape and curvature. Due to such greater rigidity, the frusto-conically shaped aft bulkhead 390 is less likely to flex under applied loads than the more flexible planar bulkhead 36, and is better able to react and directly transfer loads between the mounting flange 350 and the outer barrel portion 325. In addition, the forward inclination of the aft bulkhead 390 permits the bulkhead 390 to at least partially transmit loads between the mounting flange 350 and the outer barrel portion 325 in tension or compression, rather than primarily in shear and bending. As a consequence, following structural damage to the inner barrel 302 due to a fan blade-out event, undamaged portions of the structure can transmit loads and retain sufficient structural stability to maintain a satisfactory inlet configuration and minimize the propagation of damage, thereby permitting an aircraft to safely fly home.

A cross section of a third embodiment of a nacelle inlet 400 according to the invention is shown in FIG. 4. The nacelle inlet 400 can include an outer shell 404 and an aft bulkhead 490 that are substantially similar to the outer shell 304 and aft bulkhead 390 described above. In this embodiment, however, the mounting flange 491 is integrally formed as part of the composite outer skin 710 of the inner barrel 700. The aft bulkhead 490 can be connected to the integral mounting flange 491 by a bracket 492 and a plurality of fasteners 497, such as rivets, bolts, or the like. As shown in FIG. 4, a forward edge of the inner barrel 700 can be joined to an interior trailing edge 421 of the outer shell 404 by a substantially Z-shaped bracket 427 and pluralities of fasteners 402, such as rivets or the like. In the embodiment shown in FIG. 4, the inner barrel 700 can be constructed in a plurality of segments joined together along longitudinally extending flanges 750, for example. Alternatively, the inner barrel 700 can be constructed as a one-piece, non-segmented barrel.

FIGS. 5A and 5B show tooling which can be used to form a composite outer shell 204 having an integral aft bulkhead portion 227 like that described above and shown in FIG. 2. FIG. 5A shows a cross sectional view of a 360° lay-up tool 900. The tool 900 can include a forward tool portion 904, an aft bulkhead tool portion 920, and a break-away ring tool portion 940. The forward tool portion 904 can include a front flange 906, a rounded nose lip portion 910, an outer barrel portion 912, and an aft attach flange 914. A front flange 906 can be located at a free forward end 905 of the forward tool portion 904. The nose lip portion 910 can forwardly extend (in the direction "F") from the front attach flange 906 to a forwardmost point 907 of the forward tool portion 904, and then rearwardly extend to the outer barrel portion 912. The outer barrel portion 912 can extend rearwardly from the nose lip portion 910 to an aft end 911 of the forward tool portion 904. The aft flange 914 outwardly extends from the outer barrel portion 912. Thus, the forward tool's nose lip portion 910 and outer barrel portion 912 are shaped similarly to the nose lip portion 223 and outer barrel portion 225, respectively, of the outer barrel 204 described above and shown in FIG. 2.

As shown in FIG. 5A, the forward tool portion 904 can be formed from a plurality of circumferential segments 903a, 903b which can be detachably secured together. In this embodiment, there are three 120 degree circumferential segments (only two segments 903a, 903b are shown), though more or fewer segments can be used. Thus, the front flange 906 and the aft flange 914 can be formed from a plurality of forward end flange segments 913 and aft flange segments 917, respectively. First and second axially extending flanges 919, 921 can extend between the forward end flange segment 913 and the aft flange segment 917, and can be provided at opposite side edges of each tool portion segment 903a, 903b. The first axially extending flange 919 on one tool portion segment 903a can be detachably secured to the second axially extending attach flange 921 of an adjacent tool segment 903b to form axially extending flange joints 999. Adjacent first and second axially extending flanges 919, 921 can be secured together with bolts or other suitable fasteners.

The aft bulkhead tool portion 920 shown in FIG. 5A includes a front attach flange 922, a canted portion 924 extending aft of the front attach flange 922, and an aft end flange 926 extending from the canted portion 924. The forward tool's aft attach flange 914 can be detachably secured to the aft bulkhead tool's front attach flange 922 via bolts or other fasteners, for example. The canted portion 924 of the aft bulkhead tool portion 920 is shaped similarly to the aft bulkhead portion 227 of an outer shell 204 (see FIG. 2), and can be used to form the outer shell's aft bulkhead portion 227. Although shown as a single, unitary piece, the aft bulkhead tool portion 920 can be formed from a plurality of circumferential segments.

As also shown in FIGS. 5A and 5B, the tool assembly 900 can further include a break-away tool portion or ring 940 for forming an inner trailing edge 221 of an outer shell 204 like that shown in FIG. 2. The break-away tool portion 940 can be a one-piece ring (not shown in FIG. 5A) if a sufficient negative draft angle or set-back feature is provided in the front attachment leg inner trailing edge 221 of the laid-up outer shell 204 to allow removal of the of the laid-up outer shell 204 from the front tool portion 904. Otherwise, the break-away tool portion 940 can be a segmented ring like that shown in FIG. 5A and can include separable ring segments 931 to allow the segments 931 to be individually removed prior to removing a laid-up outer shell 204 (not shown) from the forward tool portion 904. The break-away tool portion 940 can be detachably secured to the front attach flange 906 using fasteners (not shown). As shown in FIG. 5B, the break-away tool portion 940 can be radially offset from the front attach flange 906 for forming an inner trailing edge 221.

According to one embodiment, a composite lay-up can be made within the tool 900 to make a continuous composite outer shell 204 like that shown FIG. 2, for example. Alternatively, circumferential shell segments can be laid-up individually on separate tool portions and/or tool segments and assembled to form a complete outer shell 204. According to another embodiment, outer shell segments can be partially laid-up on separate tool portions and/or tool segments, and the tool portions/tool segments can then be assembled together and lap-seams applied to bond the outer shell segments together to form a complete outer shell 204. Once an outer shell 204 has cured in the tool assembly 900, the forward tool 904, the aft bulkhead tool 920, the break-away ring tool 940, and other tool segments such as the forward tool segments 905 and the break-away ring tool segments 931, can be separated to facilitate removal of a cured outer shell 204 from the tools 904, 920, 940. One of ordinary skill in the art would understand how to manufacture an outer shell in the disclosed lay-up tool 900.

Figure 5C:
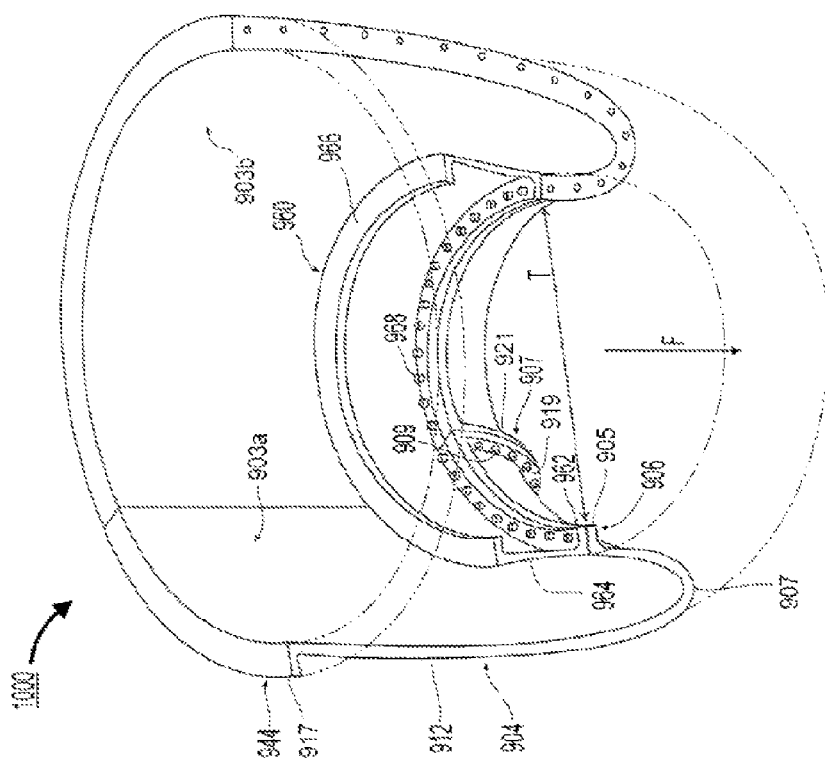
FIG. 5C is a cross sectional view of another form tool for producing an outer shell of a nacelle inlet.

In some embodiments, the trailing inside portion of a nose lip portion of an outer shell can be extended farther aftward than the nose lip portions 223, 323, 423 shown in FIGS. 2-4. In such a case, a lay-up tool 1000 like that shown in FIG. 5C can be used. The tool 1000 can be substantially similar to the tool 900 shown in FIG. 5A, and like components shown in FIGS. 5A and 5C have like reference numerals. Unlike the tool 900 described above, however, the tool 1000 does not include an aft bulkhead tool 920 or a break-away tool portion 940. As shown in FIG. 5C, the tool 100 can include a nose lip extension tool portion 960 for forming an extended nose lip portion. The nose lip extension tool portion 960 can include a front attach flange 962, an axially extending portion 964 extending rearwardly from the front attach flange 962, and an aft end flange 966 extending transversely from the axially extending portion 964. The front attach flange 906 of the forward tool 904 can be detachably secured to the front attach flange 962 of the nose lip extension tool portion 960 using fasteners 968, for example. The nose lip extension tool portion 960 can be substituted for the break-away tool portion 940 in previously described tool 900 for forming an outer shell having both an aft bulkhead portion and an extended nose lip portion. The lay-up process for forming a composite outer shell using the lay-up tool 1000 can be substantially similar to that discussed above with respect to tool 900 shown in FIGS. 5A and 5B.

Figure 6:
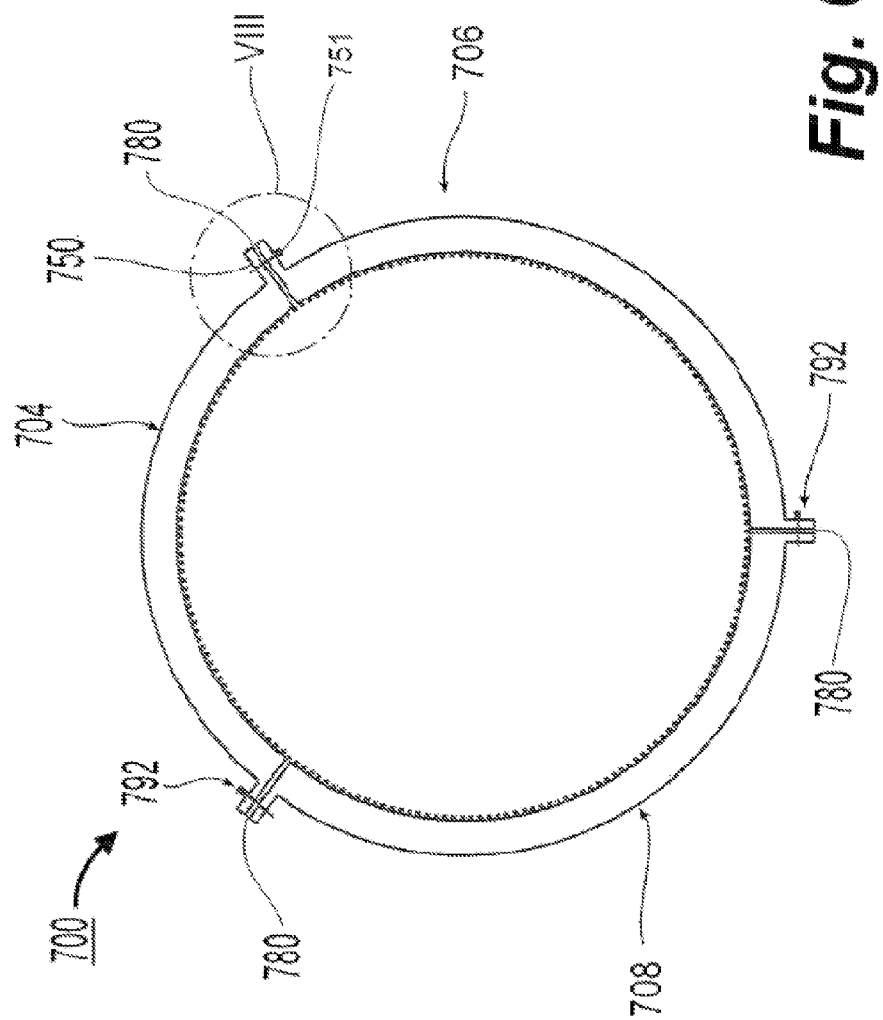
FIG. 6 is a longitudinal cross section of a segmented inner barrel.

FIG. 6 shows a cross-sectional view of one embodiment a circumferentially segmented acoustic inner barrel 700 of a type that can be employed in conjunction with a nacelle inlet 400 like that described above and shown in FIG. 4, for example. As shown in FIG. 6, the circumferentially segmented acoustic inner barrel 700 can include three circumferential segments 704, 706, 708. Alternatively, a circumferentially segmented acoustic inner barrel can include a different number of circumferential segments, such as two, four, or more. Each circumferential end of a circumferential segment 704, 706, 708 is provided with a pair of radially outwardly projecting flanges 750, 751 that extend in a longitudinal direction substantially entirely along the length of the acoustic inner barrel 700. Adjacent circumferential segments mate along a longitudinal splice 780 where their radially outwardly projecting flanges 750, 751 oppose one another.

Figure 7:
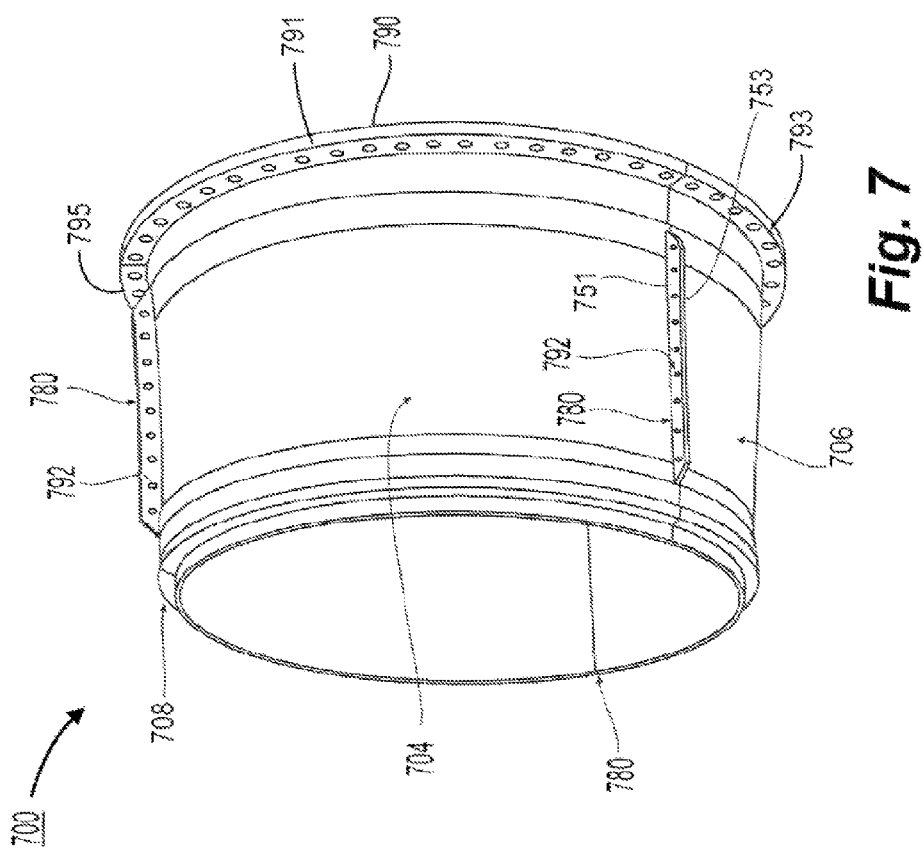
FIG. 7 is a perspective view of a segmented inner barrel.

As shown in FIG. 7, each circumferential segment of the acoustic inner barrel 700 can include an upstanding attachment flange 790 at its aft end. The upstanding attachment flange 790 can be formed from a plurality of circumferential upstanding attachment flange segments 791, 793, 795, and can be machined with one or more circumferentially spaced apart bolt holes for attachment to a forward flange of an engine fan case (not shown). Circumferentially facing flanges 751, 753 of adjacent circumferential segments can extend substantially along the length of the acoustic inner barrel 700, and can be secured to a mating flange by a plurality of spaced fasteners 792.

Figure 8:
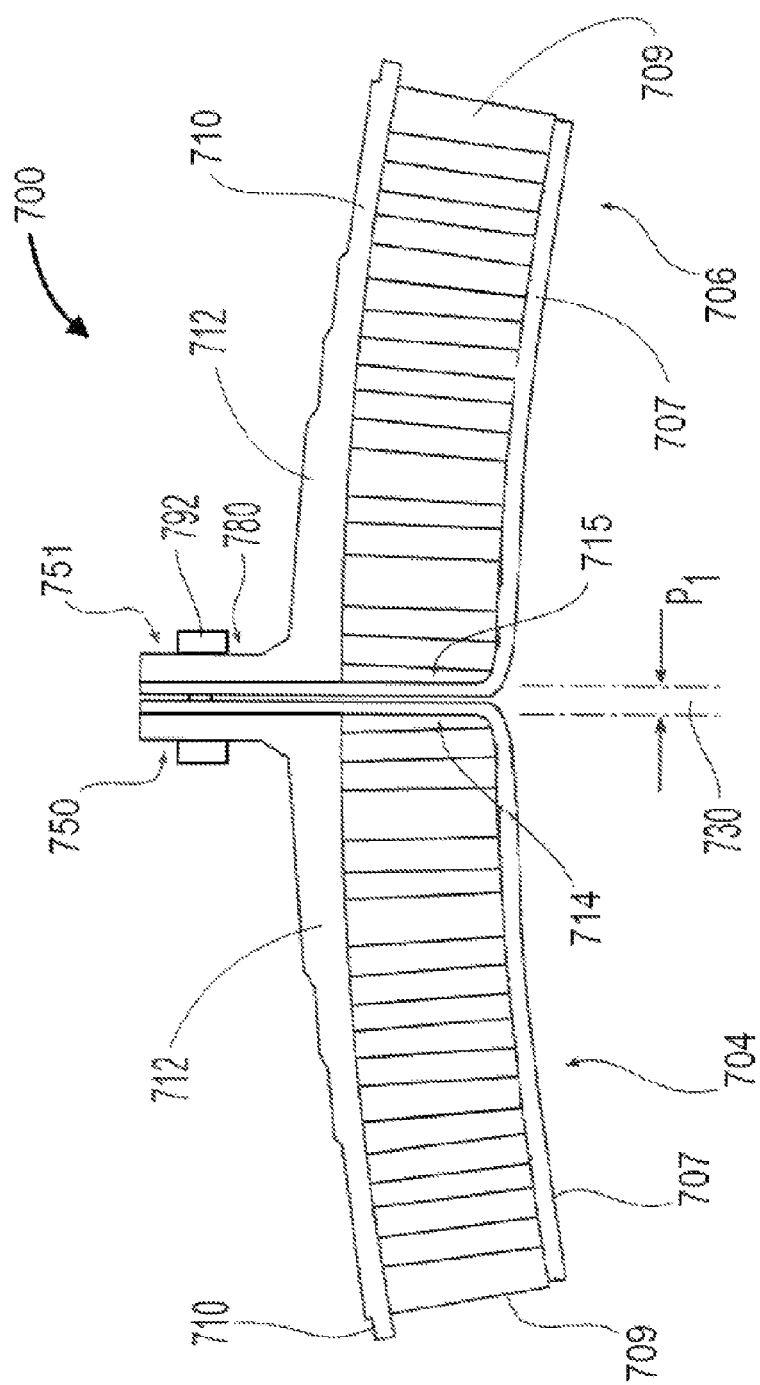
FIG. 8 is a longitudinal cross-sectional view of a longitudinal joint between segments of an inner barrel.

FIG. 8 shows a detailed view of a cross-section of one embodiment of a longitudinal splice joint 780 which can be used to join the longitudinal edges of two adjacent inner barrel segments, such as segments 704 and 706, for example. In one embodiment, each circumferential segment 704, 706 includes an inner skin 707, an acoustic core 709, and an outer skin 710. As shown in FIG. 8, the outer skin 710 can include a thickened portion 712 in the region where the two circumferential segments 704, 706 meet at the splice 780. As shown in FIG. 8, facing inner skin portions 714, 715 of adjacent segments 704, 706 can be wrapped around the edges of their core sections 709 such that they extend into the splice joint 780. Additional plies of a prepeg fabric can be provided on the outer shell 710 at the circumferential edges of each segment 704, 706 to form the thickened regions 712 and facing flanges 750, 751. The segments 704, 706 can then be cured in an autoclave using known methods. When assembled to form a complete inner barrel 700, the effective gap 730 between the opposed inner skin portions 714, 715 (i.e., the acoustical discontinuity) can have an acoustically negligible width, designated P1. In one embodiment, the gap width P1 is less than or equal to approximately 0.2 inches, or about 5 mm. Providing such a minimal acoustic splice effectively creates the acoustic benefits of a continuous 360° one-piece acoustic inner barrel, while retaining the damage propagation stop features of a circumferentially segmented inner barrel. Alternatively, the inner barrel 700 can be assembled by bonding an inner skin 707, cellular core 709 and outer skin 710 to form an integral unit having no longitudinal joints.

Figure 9:
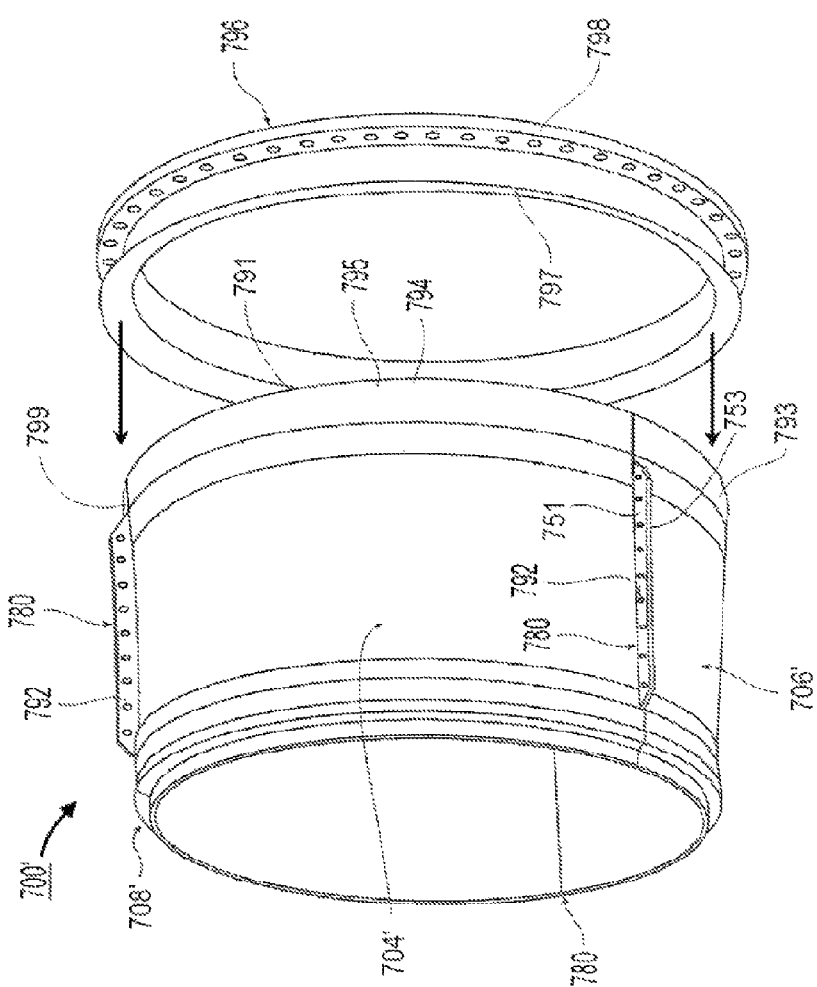
FIG. 9 is a perspective view of another embodiment of a segmented inner barrel.

FIG. 9 shows a perspective view of another embodiment of a segmented inner barrel 700'. The inner barrel 700' includes a plurality of circumferential segments 704', 706', 708' and is similar to the inner barrel 700 described above except the inner barrel 700' includes a reduced diameter aft end portion 794 formed from the aft ends 791, 793, 799 of the circumferential segments 704', 706', 708'. The aft end portion 794 receives a 360-degree engine attach ring 796 which helps to secure the aft ends 791, 793, 799 together. The engine attach ring 796 can be received over and secured to the reduced diameter portion 794 of the inner barrel 700' using known techniques, such as by adhesives or mechanical fasteners, for example.

As described above with reference to FIG. 4, a nacelle inlet 400 can include an outer skin 404 and an acoustic inner barrel 700 constructed from a plurality of circumferential segments 704, 706, 708. Alternatively, a nacelle inlet can include an outer skin 404 and an acoustic inner barrel 700' constructed from a plurality of circumferential segments 704', 706', 708'. In the case of a fan blade-out event, only one of the plurality of circumferential segments 704, 706, 708 or 704', 706', 708' is likely to be damaged initially, and this damage generally will not propagate to an adjacent circumferential segment due to the longitudinal discontinuities between segments. Since undamaged circumferential segments are affixed to the remaining undamaged structure, they can help augment the stability and fly-home capability of the nacelle inlet 400.

Figure 10:
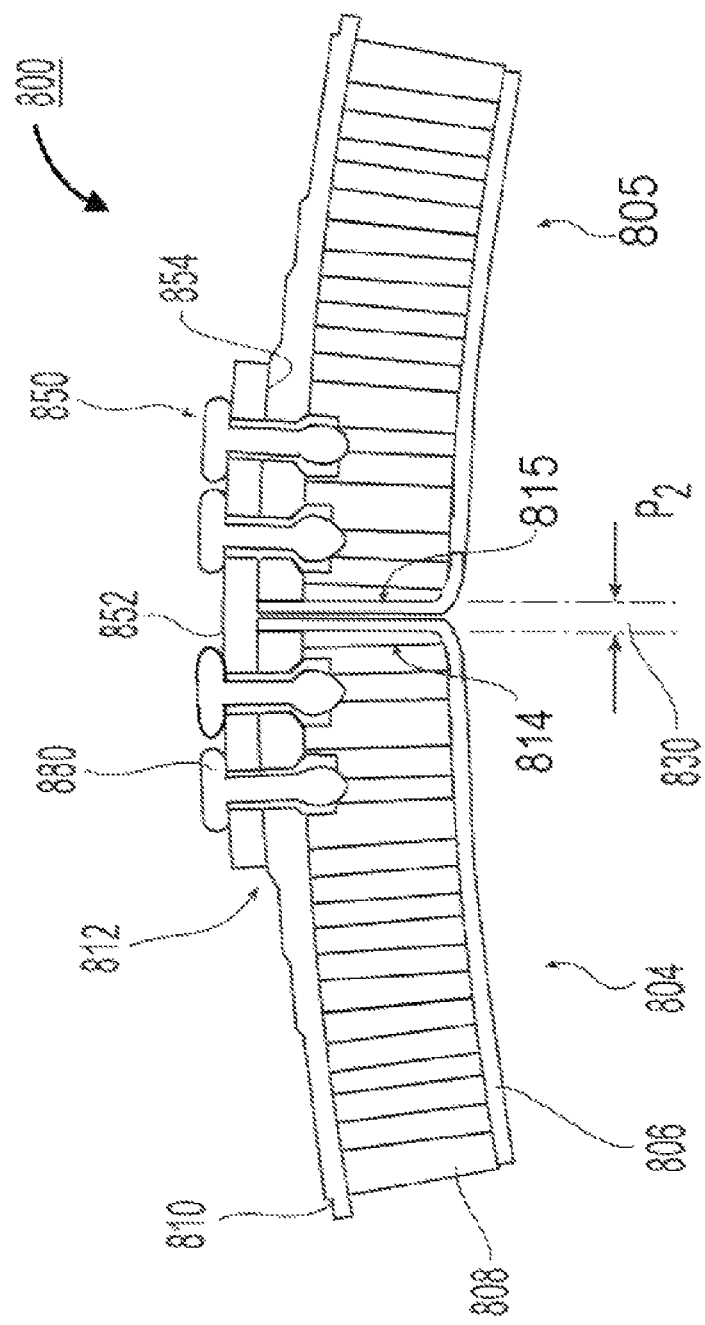
FIG. 10 is a longitudinal cross-sectional view of another longitudinal joint between segments of an inner barrel.

FIG. 10 shows a cross-section of an alternative construction for a segmented inner barrel 800 having an acoustically negligible gap P2 between two adjacent segments 804, 805. Each circumferential segment 804, 805 can include a perforated inner skin 806, an acoustic core 808, and an imperforate outer skin 810. As shown in the figures, the outer skin 810 can include a thickened region 812 where the two circumferential segments 804, 805 meet. The facing inner skin portions 814, 815 can be wrapped radially outward as shown. An acoustically negligible gap 830 of width length P2 can exist between the inner skin portions 814, 815. In one embodiment, P2 is less than or equal to 0.2 inches, or about 5 mm.

In the embodiment shown in FIG. 10, the acoustic inner barrel 800 includes reinforcement members 850 in the form of splice plates 852 secured to the outer shell 810 by fastening members 880. As seen in FIG. 10, the reinforcement member 850 is attached to the barrel 800 such that an inner surface 854 of the splice plate 852 is joined to the outer surface of the outer shell 810 of the inner barrel 800. The fastening members 880 extend transversely through the splice plate 852, through the outer shell 810 of the inner barrel 800 and at least partially into the cellular core 808. The splice plate 852 can be secured to the outer shell 810 by blind fasteners installed from the back side and penetrating the thickened portion 812 of the outer shell 810. The fastening members 880 occupy only a small amount of the cross-sectional area of the cellular core 810 and do not extend to or block perforations in the inner skin 806 of the inner barrel 800. Thus, such a spliced connection will not detrimentally affect the acoustic performance of the barrel 800.

The circumferentially segmented acoustic inner barrel 800 can be used in a manner similar to the circumferentially segmented acoustic inner barrel 700, 700' described above. The circumferentially segmented acoustic inner barrel 800 can help provide a nacelle inlet 400 with fly-home capability in addition to that provided by other improvements to the nacelle inlet 400.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A nacelle inlet portion comprising:
   an annular inner barrel having a forward flange and an aft portion located farther aft than the forward flange; and
   a single piece outer shell having a rounded nose lip portion and being attached to the forward flange and to the aft portion
   wherein the single piece outer shell forms an outer barrel portion and an aft bulkhead, wherein the aft bulkhead is formed between the outer barrel portion and the aft portion of the annular inner barrel,
   wherein the aft bulkhead extends radially inwardly and rearwardly from an aft edge point of the outer barrel potion to the aft portion of the annular inner barrel,
   wherein the single piece outer shell transitions continuously to form the rounded nose lip portion, aft bulkhead, and outer barrel portion, and
   wherein the single piece outer shell is formed by spin forming.

2. A nacelle inlet portion as in claim 1, wherein the outer shell comprises a plurality of joined circumferential segments.

3. A nacelle inlet portion as in claim 1, wherein the nose lip portion forms two or more annular segments.

4. A nacelle inlet portion as in claim 1, wherein the inner barrel is a one-piece 360 degree structure.

5. A nacelle inlet portion as in claim 1, wherein the inner barrel comprises a plurality of joined circumferential segments.

6. A nacelle inlet portion as in claim 1, wherein the inner barrel comprises a perforated inner skin and an imperforate outer skin.

7. A nacelle inlet portion as in claim 6 further comprising a honeycomb core, the honeycomb core being disposed between the inner skin and the outer skin.

8. A nacelle comprising:
   an inner barrel having a forward flange and an aft portion located farther aft than the forward flange;
   a single piece outer shell forming an outer barrel portion and an aft bulkhead;
   the aft bulkhead having a trailing edge attached to the aft portion of the inner barrel; and
   the single piece outer shell having a rounded nose lip portion and being attached to the forward flange of the inner barrel wherein the single piece outer shell is formed by spin forming.

9. A nacelle as in claim 8, wherein the outer shell comprises a plurality of joined circumferential segments.

10. A nacelle as in claim 8, wherein the inner barrel comprises a perforated inner skin and an imperforate outer skin.

11. A nacelle as in claim 10 further comprising a honeycomb core, the honeycomb core being disposed between the inner skin and the outer skin.

12. A nacelle comprising:
    an inner barrel having a forward flange and an aft portion;
    a single piece outer shell forming an outer barrel portion and an aft bulkhead;
    the aft bulkhead being disposed entirely aft of the forward flange and having a trailing edge attached to the aft portion of the inner barrel; and
    the single piece outer shell having a rounded nose lip portion and being attached to the forward flange of the inner barrel wherein the single piece outer shell is formed by spin forming.

13. A nacelle as in claim 12, wherein at least a portion of the inner barrel is acoustically treated.

* * * * *